UNITED STATES PATENT OFFICE.

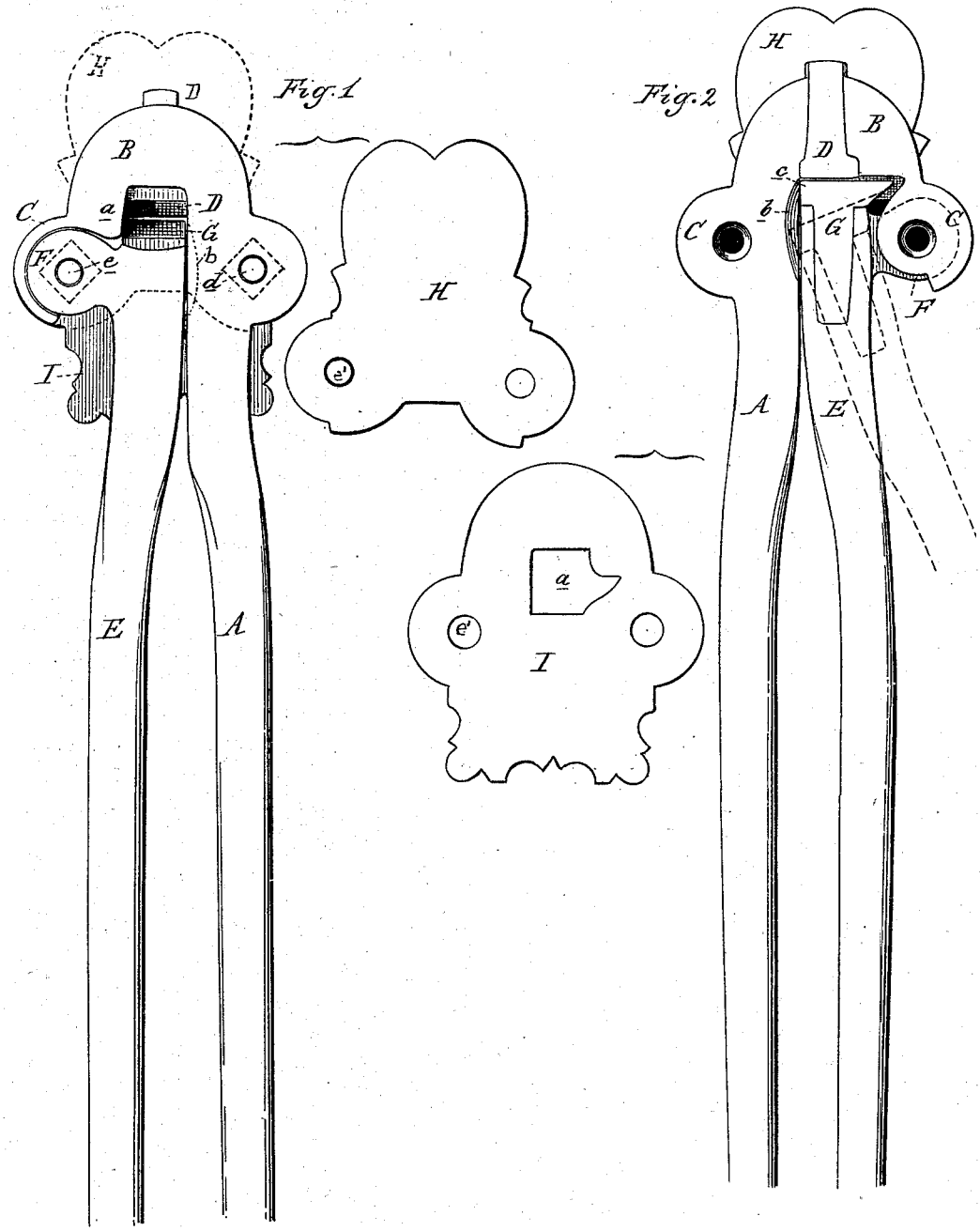

AZOR BLOWERS, OF CAMBRIDGE, MICHIGAN.

BOLT-CUTTER.

SPECIFICATION forming part of Letters Patent No. 257,916, dated May 16, 1882.

Application filed November 19, 1881. (No model.)

*To all whom it may concern:*

Be it known that I, AZOR BLOWERS, of Cambridge, in the county of Lenawee and State of Michigan, have invented an Improvement in Bolt-Cutters, of which the following is a specification.

The nature of this invention relates to certain new and useful improvements in the devices for cutting off the ends of bolts and rivets, such as are usually denominated "bolt-cutters."

The invention consists in the peculiar details of construction and the combination of the various parts, as more fully hereinafter described.

Figure 1 is a plan view of one side of my device with the face-plate removed and resting beside the tool. Fig. 2 is a plan view of the reverse side with its face-plate removed and resting beside the tool.

In the accompanying drawings, which form a part of this specification, A represents one of the handles of my device, terminating in an overhanging head, B, which in turn terminates in an ear, C. A cutter, D, is suitably secured in the head, with its cutting-edge projecting into the space $a$ in the head. E is the other handle, which is provided with an ear, F, and a suitable bolt, $e$, secures this handle to its fellow by passing through the ears C and F. To the upper end of this handle E is suitably secured a cutter, G, which projects upward into the space $a$ in the head, which is cut away at $b$ to allow the projecting point $c$ of the cutter G to freely play. The bolt $e$, which secures the handles together, passes through coincident holes $e'$ in the two face-plates H and I, and, with another bolt, $d$, through the opposite side of the tool, holds said face-plates in place. By opening or spreading the handles, as shown in dotted lines in Fig. 2, the knife or cutter G is retracted, thereby disclosing fully the space $a$ in the head, into which the end of the bolt to be cut should be inserted. Closing the handles together forces the cutter G toward the cutter D, and by a drawing cut severs the interposed bolt.

This device may be made of any desired size adapted to the work to be performed.

What I claim as my invention is—

1. In a bolt-cutting device, the handle A, with an overhanging head, B, ear C, and cutter D, in combination with the handle E, ear F, and cutter G, and suitable means for holding the parts together, the parts constructed, arranged, and operating substantially as and for the purposes described.

2. In combination, the handles A E, ears C F, and cutters D G, with the face-plates H I, and suitable means for securing the parts together and holding the plates in their respective places, all being constructed, arranged, and operating substantially as set forth.

AZOR BLOWERS.

Witnesses:
CHAS. J. HUNT,
H. S. SPRAGUE.